(12) United States Patent
Skaradzinski

(10) Patent No.: US 12,194,926 B2
(45) Date of Patent: Jan. 14, 2025

(54) CAMERA SYSTEM FOR A TRAILER

(71) Applicant: Great Dane LLC, Chicago, IL (US)

(72) Inventor: Dennis J. Skaradzinski, Savannah, GA (US)

(73) Assignee: Great Dane LLC, Chicago, IL (US)

( * ) Notice: Subject to any disclaimer, the term of this patent is extended or adjusted under 35 U.S.C. 154(b) by 14 days.

(21) Appl. No.: 16/570,871

(22) Filed: Sep. 13, 2019

(65) Prior Publication Data

US 2021/0078504 A1    Mar. 18, 2021

(51) Int. Cl.
*B60R 11/04*    (2006.01)
*B62D 33/04*    (2006.01)
*B62D 53/08*    (2006.01)
*B62D 63/06*    (2006.01)
*G06V 20/56*    (2022.01)
*H04N 7/18*    (2006.01)
*H04N 23/90*    (2023.01)
*B60R 11/00*    (2006.01)
*B62D 33/02*    (2006.01)
*B62D 49/00*    (2006.01)
*H04W 4/46*    (2018.01)

(52) U.S. Cl.
CPC .............. *B60R 11/04* (2013.01); *B62D 33/04* (2013.01); *B62D 53/0842* (2013.01); *B62D 63/06* (2013.01); *B62D 63/068* (2013.01); *G06V 20/56* (2022.01); *H04N 7/18* (2013.01); *H04N 23/90* (2023.01); *B60R 2011/004* (2013.01); *B60Y 2200/148* (2013.01); *B62D 33/02* (2013.01); *B62D 49/005* (2013.01); *H04W 4/46* (2018.02)

(58) Field of Classification Search
CPC .............. B60R 11/04; B60R 2011/004; B60R 2300/808; B60R 1/00; B60R 2300/105; B60R 2001/1253; B60R 2300/8066; B60R 2300/101; B60R 2300/301; B60R 2300/302; B60R 1/002; B62D 33/02; B62D 33/04; B62D 49/005
USPC .......................................................... 280/433
See application file for complete search history.

(56) References Cited

U.S. PATENT DOCUMENTS

| | | | |
|---|---|---|---|
| 5,242,185 A * | 9/1993 | Carr ..................... | B62D 53/061 280/423.1 |
| 8,032,277 B2 | 10/2011 | Larschan et al. | |
| 8,155,867 B2 | 4/2012 | Krause | |
| 8,307,667 B2 | 11/2012 | Rusignuolo et al. | |
| 10,027,805 B2 | 7/2018 | Husain et al. | |
| 2007/0296578 A1 * | 12/2007 | Duff ........................ | G01S 13/56 340/567 |
| 2008/0303311 A1 * | 12/2008 | Roush ................... | B62D 35/001 296/180.4 |
| 2016/0050356 A1 | 2/2016 | Nalepka et al. | |

(Continued)

OTHER PUBLICATIONS

Office Action dated Oct. 5, 2021, for corresponding Canadian application No. 3,091,475.

*Primary Examiner* — Masum Billah
(74) *Attorney, Agent, or Firm* — Nelson Mullins Riley & Scarborough LLP

(57) ABSTRACT

A trailer for use with a truck has a wheeled chassis having at least one wheeled axle at a rearward end of the wheeled chassis. A body has a cargo deck supported by the wheeled chassis. A camera is mounted to at least one of the wheeled chassis and the body so that a field of view of the camera includes a tractor when the tractor is operatively coupled to the wheeled chassis.

12 Claims, 8 Drawing Sheets

(56) References Cited

U.S. PATENT DOCUMENTS

| | | | |
|---|---|---|---|
| 2016/0052453 A1* | 2/2016 | Nalepka | H04N 5/44 |
| | | | 348/148 |
| 2017/0262717 A1 | 9/2017 | Drazan et al. | |
| 2018/0039266 A1* | 2/2018 | Dotzler | G05D 1/0022 |
| 2019/0064835 A1* | 2/2019 | Hoofard | B60T 7/22 |
| 2019/0302764 A1* | 10/2019 | Smith | G05D 1/0061 |
| 2020/0039487 A1* | 2/2020 | Prabhakar | B60T 8/1708 |
| 2020/0324763 A1* | 10/2020 | Switkes | G08G 1/161 |

* cited by examiner

1

CAMERA SYSTEM FOR A TRAILER

TECHNICAL FIELD

The present disclosure relates generally to camera systems and, more generally, to camera systems used with trailers.

BACKGROUND

Semi-trailer trucks are used to transport large quantities of manufactured goods, produce, livestock, building materials, etc., from centralized loading facilities to downline consumers, often at great distances. One of the known logistical issues related to such transport operations is the mis-identification of trailers by tractor unit operators.

In a typical transport operation, an operator of a tractor unit is assigned a previously loaded trailer for transport, with the trailer being identifiable by indicia disposed thereon, a space number in a lot, dock number at a loading facility, etc. The tractor unit operator may receive this identification information prior to, or when arriving at, the storage location of the trailer. Once the operator of the tractor unit identifies what is believed to be the assigned trailer, the operator engages the trailer and proceeds to the assigned destination. As noted, mis-identification of trailers is known to occur, often leading to delivery of trailers to the incorrect destinations. Such mis-identification issues can result in missed delivery deadlines, wasted natural resources, spoilage in those instances where the delivered goods are perishable, man hours, etc. As such, there exists a need for systems, and methods of use thereof, to facilitate proper identification of trailers of semi-trailer trucks during transport operations.

It has been proposed with regard to vehicle-to-vehicle (V2V) communications systems, for a tractor of a semi-truck to carry a camera that captures an image of a machine readable (QR) code on the trailer, wherein the QR code carries information about the trailer's dimensions for use by the tractor's V2V software to provide information to other vehicles about the semi-truck's position during operation and for purposes of auto-navigation safety.

SUMMARY

One or more embodiments of a trailer for use with a truck including a tractor have a wheeled chassis having at least one wheeled axle at a rearward end of the wheeled chassis and a support at a forward end of the wheeled chassis. A body has a cargo deck supported by the wheeled chassis. A camera is mounted to at least one of the wheeled chassis and the body so that a field of view of the camera includes a tractor when the tractor is operatively coupled to the wheeled chassis.

In one or more other embodiments, a semi-trailer has a tractor having a fifth wheel and a wheeled chassis having at least two wheeled axles at a rearward end of the wheeled chassis and retractable legs and a kingpin at a forward end of the wheeled chassis. The trailer has a body having a cargo deck supported by the wheeled chassis. A camera is mounted to at least one of the wheeled chassis and the body so that a field of view of the camera includes the tractor when the tractor is operatively coupled to the wheeled chassis by the kingpin.

In one or more still further embodiments, a method of confirming coupling of a tractor of a semi-trailer truck to a trailer includes providing a trailer having a wheeled chassis having at least two wheeled axles at a rearward end of the wheeled chassis, retractable legs, and a kingpin at a forward end of the wheeled chassis, and a body having a cargo deck supported by the wheeled chassis. A camera is mounted to at least one of the wheeled chassis and the body so that a field of view of the camera includes a tractor when the tractor is operatively coupled to the wheeled chassis by the kingpin. An image is acquired from the camera.

The accompanying drawings, which are incorporated in and constitute a part of this specification, illustrate one or more embodiments of the invention and, together with the description, serve to explain the principles of the disclosure herein.

BRIEF DESCRIPTION OF THE DRAWINGS

The disclosure herein references the accompanying drawings, in which some, but not all embodiments of the disclosure are shown. Indeed, this subject matter of this disclosure may be embodied in many different forms and should not be construed as limited to the embodiments set forth herein.

Figure 1:
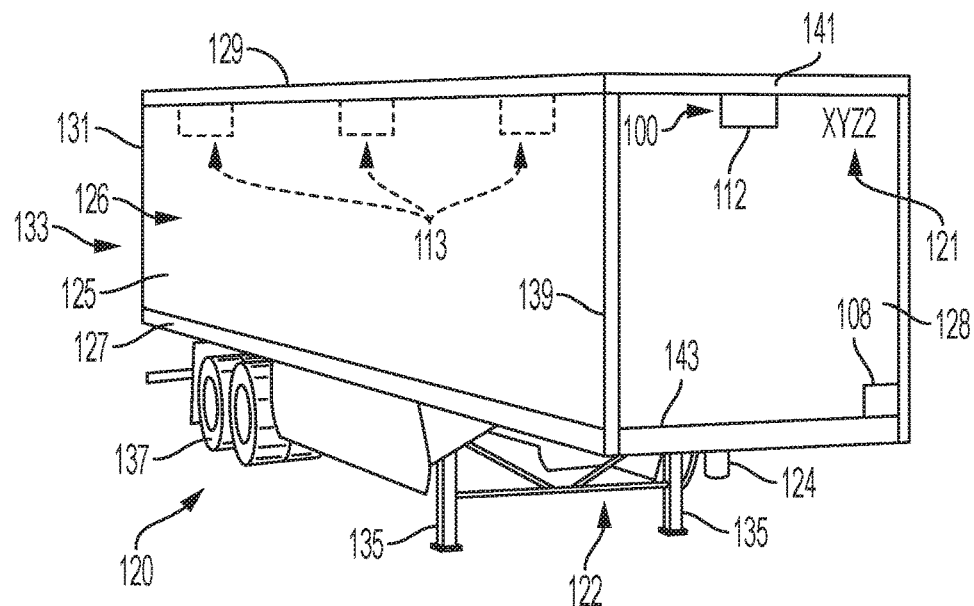
FIG. 1 is a perspective view of a semi-trailer having a camera system in accordance with an embodiment of the present invention.

Repeat use of reference characters in the present specification and drawings is intended to represent same or analogous features or elements of the invention according to the disclosure.

DETAILED DESCRIPTION

Reference will now be made in detail to present embodiments of the disclosure, one or more examples of which are illustrated in the accompanying drawings. Each example is provided by way of explanation of the disclosure, not limitation of the disclosure. In fact, it will be apparent to those skilled in the art that modifications and variations can be made in the present disclosure without departing from the scope or spirit thereof. For instance, any number of features illustrated or described as part of one embodiment may be used on another embodiment, in any combination, to yield a still further embodiment. Thus, it is intended that the present disclosure covers such modifications and variations as come within the scope of the appended claims and their equivalents.

It should be understood that terms of orientation, e.g. "forward," "rearward," "upper," "lower," and similar terms as used herein are intended to refer to relative orientation of components of the devices described herein with respect to each other under an assumption of a consistent point of reference but do not require any specific orientation of the overall system. Thus, for example, the discussion herein may refer to a "forward" or "front" end of semi-trailer, referring to a direction toward the end of the trailer that has the kingpin that is received by a fifth wheel at the "rearward" or "rear" end of a tractor, or a "rearward" end of the trailer, referring to a direction toward the trailer's rear, at which the rear frame and doors are disposed. The present discussion may also refer to "upper" and/or "lower" surfaces of the trailer and/or its components, generally with regard to the orientation of the trailer as shown in FIG. 1. Such terms may be used in the present disclosure and claims and will be understood to refer to a relative orientation but not to an orientation of the trailer with respect to an external frame of reference.

Further, either of the terms "or" and "one of _____ and _____," as used in this disclosure and the appended claims is intended to mean an inclusive "or" rather than an exclusive "or." That is, unless specified otherwise, or clear from the context, either of the phrases "X employs A or B" and "X employs one of A and B" is intended to mean any of the natural inclusive permutations. That is, either phrase is satisfied by any of the following instances: X employs A; X employs B; or X employs both A and B, regardless whether the phrases "at least one of A or B" or "at least one of A and B" are otherwise utilized in the specification or claims. In addition, the articles "a" and "an" as used in this application and the appended claims should generally be construed to mean "one or more" unless specified otherwise or clear from the context to be directed to a singular form. Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

Figure 2:
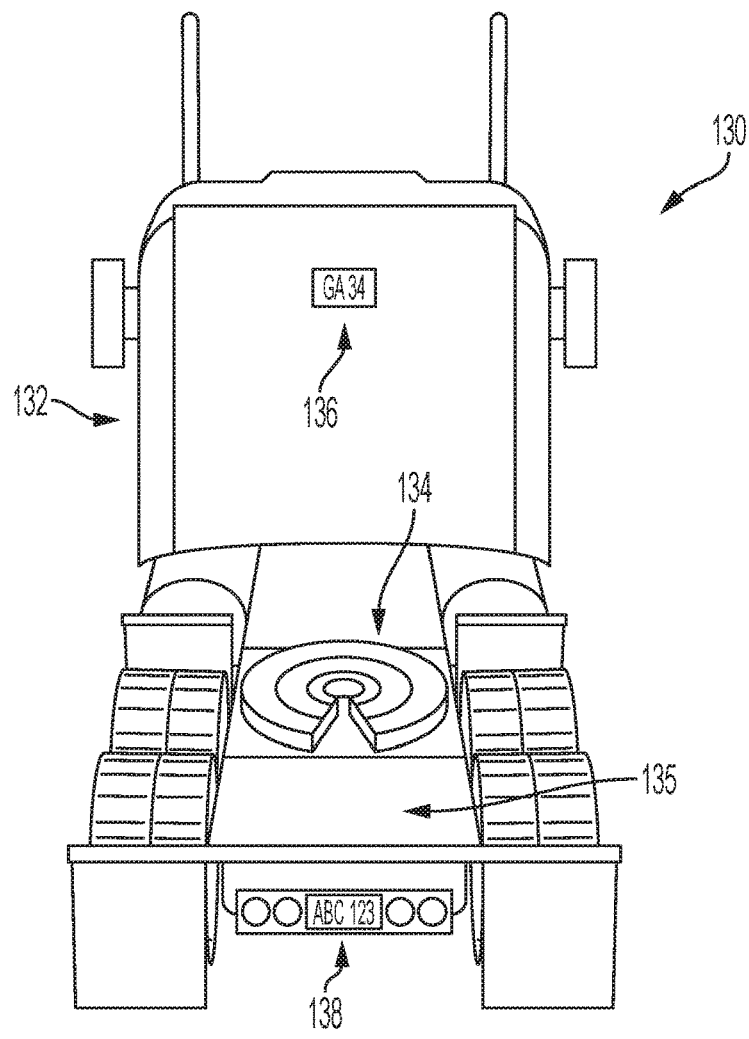
FIG. 2 is a perspective view of a tractor of a semi-trailer truck for use with a trailer as in FIG. 1.
Figure 3:
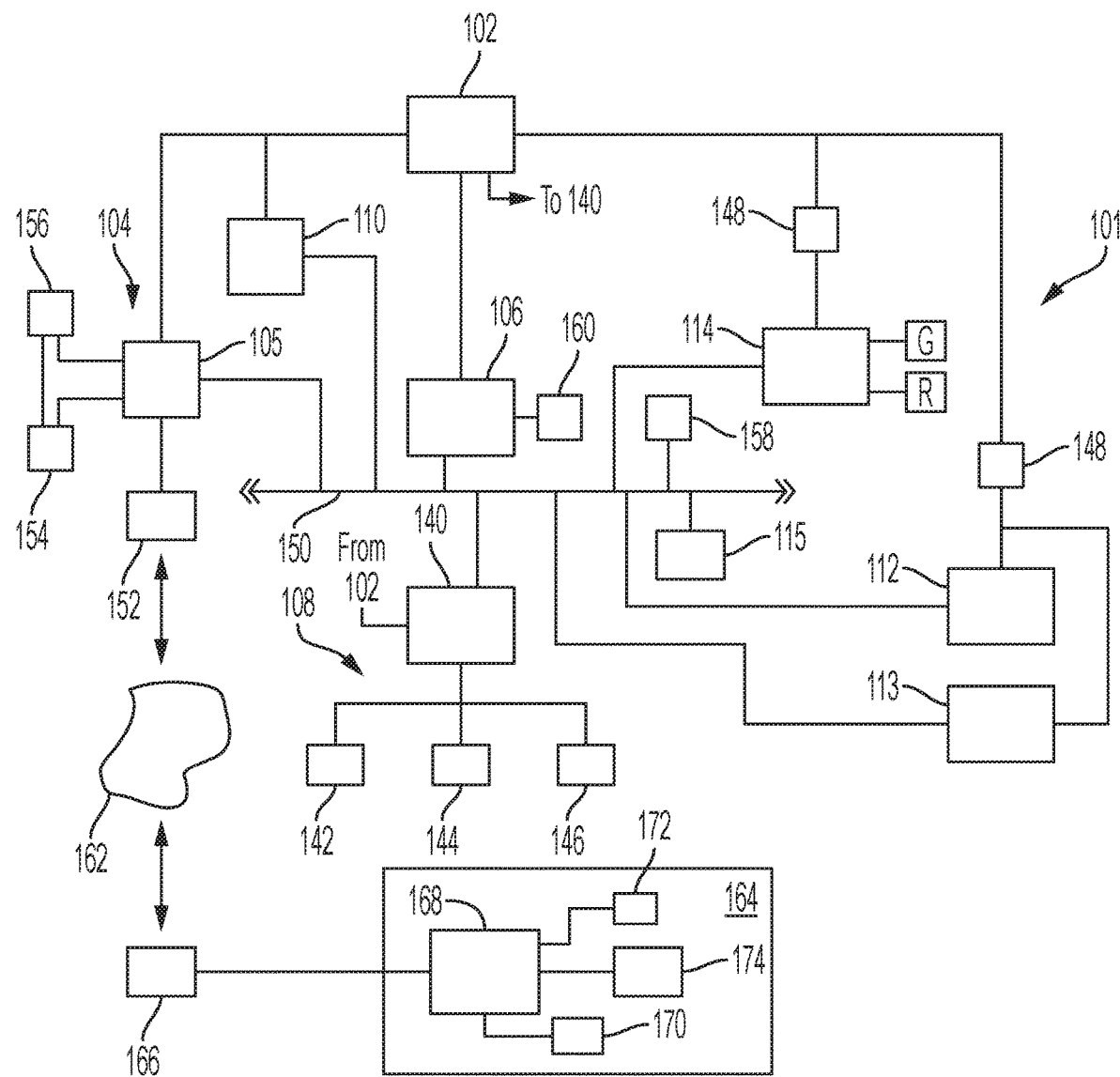
FIG. 3 is a schematic illustration of the camera system as in FIG. 1.

Referring now to FIG. 3, an example of a camera system 100 in accordance with one or more embodiments may be utilized with semi-trailer trucks having a tractor, for example a tractor 130 illustrated in FIG. 2, and a semi-trailer, an example of which is illustrated in FIG. 1. Camera system 100 may include a power source 102, a remote communications component 104, a processor 106, an input interface component 108, an event sensor 110, a camera array comprising an exterior trailer camera 112 and one or more interior cameras 113, and an alarm 114. Camera system 100 may facilitate confirmation of the operational attachment of trailers 120 to tractors 130 by the fleet operators of the semi-trucks, thereby facilitating transport operations.

As shown in FIG. 2, an example trailer 120 of a semi-trailer truck may include a frame 122 supporting a cargo area 126 and a kingpin 124 secured to the underside of the forward end of the frame that allows trailer 120 to be releasably engaged by a fifth wheel 134 (FIG. 2) of a tractor 130. Trailer 120 may also include an indicia 121, for example on its front end, that allows the trailer to be identified by the tractor operator so that the tractor operator may select the correct trailer for coupling to the tractor for transport therewith. Indicia 121 may be an alphanumeric series of characters, as shown in FIG. 1, but may also comprise other suitable indicia, for example the trailer license plate disposed at the trailer's rear frame, as should be understood. For van-type trailers, such as shown in FIGS. 1 and 5-8, indicia 121 may be disposed on a front wall 128 of the trailer, whereas for platform (or "flat bed") trailers (see FIGS. 9 and 10), the indicia (not shown) may be disposed on a front surface of the frame, e.g. as indicated at 238 or on a forward face of a front bulkhead (not shown) that extends upward from a front end of some platform trailers, e.g. to a height of about forty-eight inches to about fifty inches above the platform trailer deck level. The trailer indicia may be similarly disposed on the front of the frame in a container trailer but may also comprise an indicia located on the container itself, so that if the container trailer is considered to be the combination of the frame and a container secured thereto, the container indicia identifies the trailer.

Figure 5:
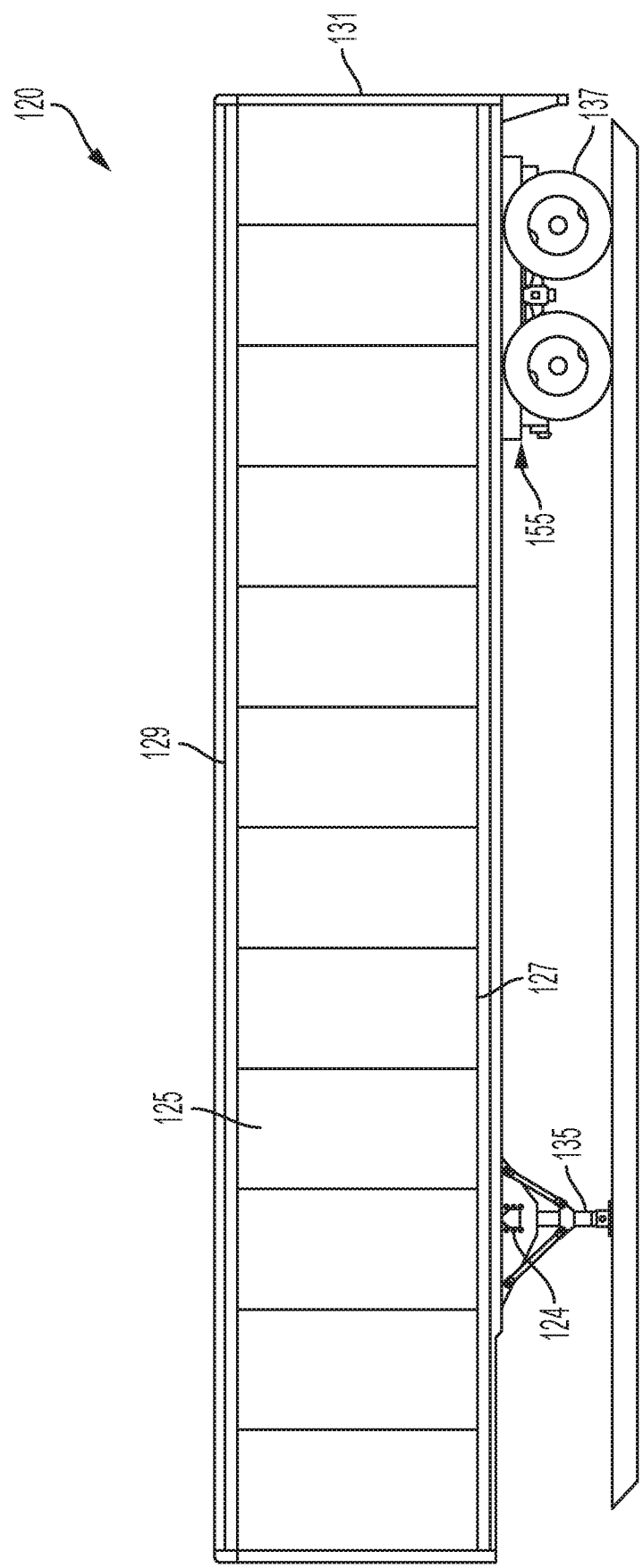
FIG. 5 is a side view of a trailer as in FIG. 1.
Figure 6:
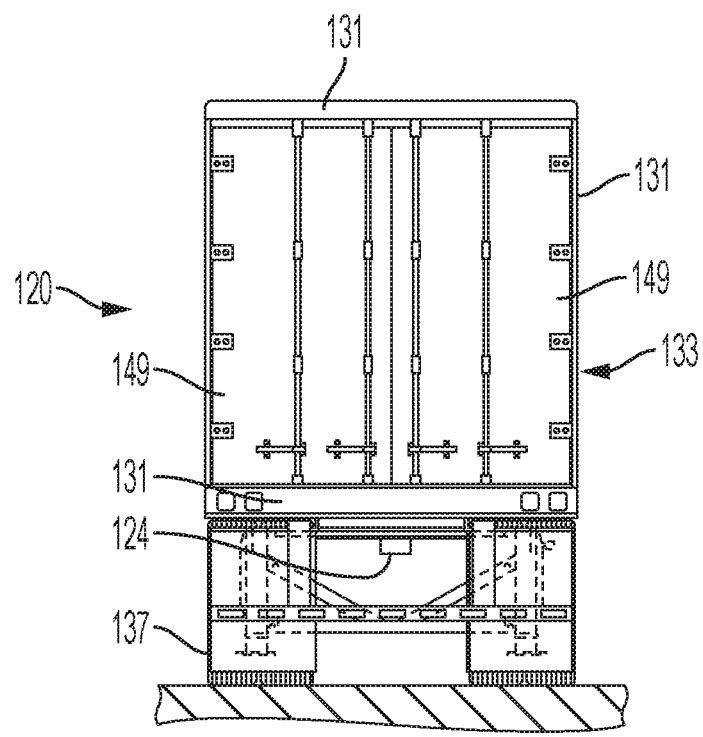
FIG. 6 is a rear view of a trailer as in FIG. 1.
Figure 7:
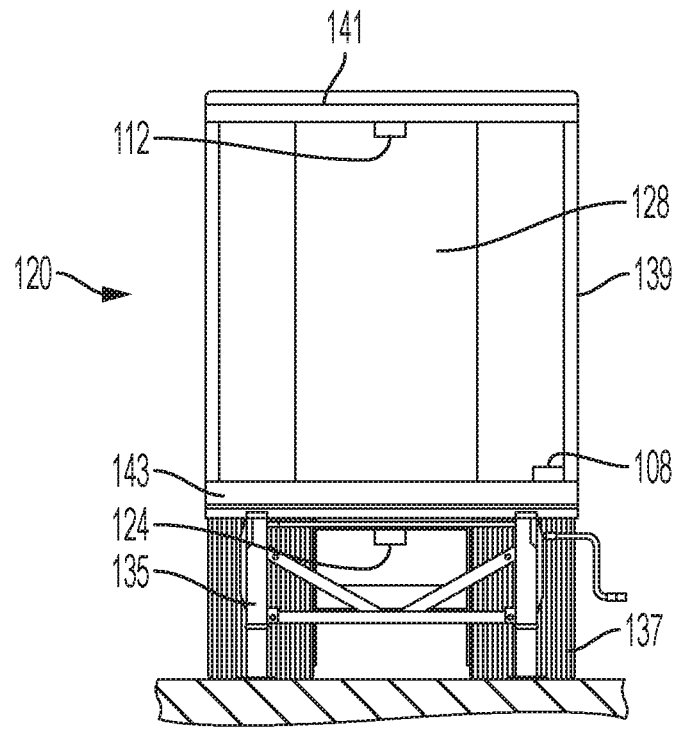
FIG. 7 is a front view of a trailer as in FIG. 1.
Figure 8:
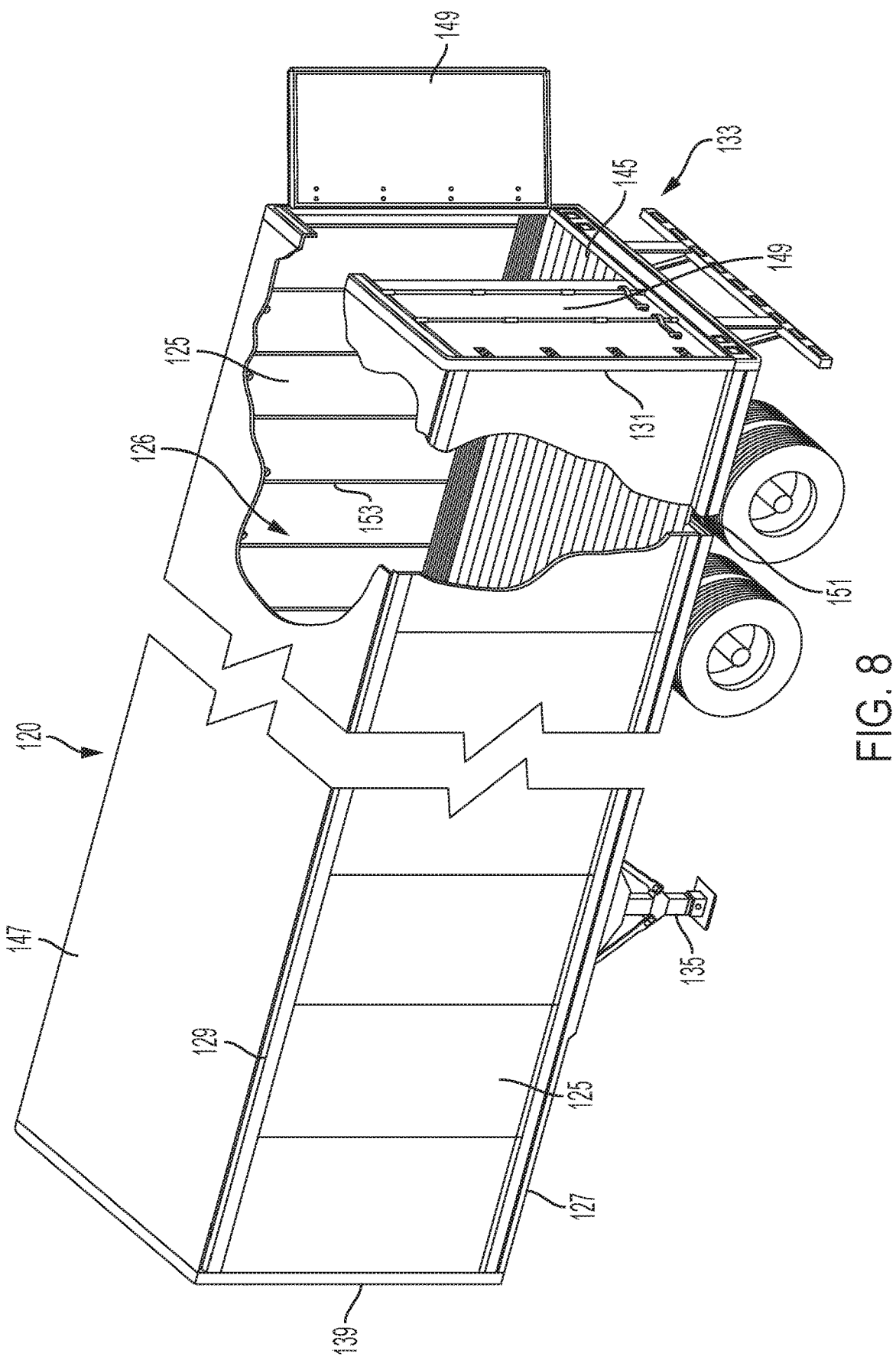
FIG. 8 is a perspective view, partly in section, of a trailer as in FIG. 1.
Figure 9:
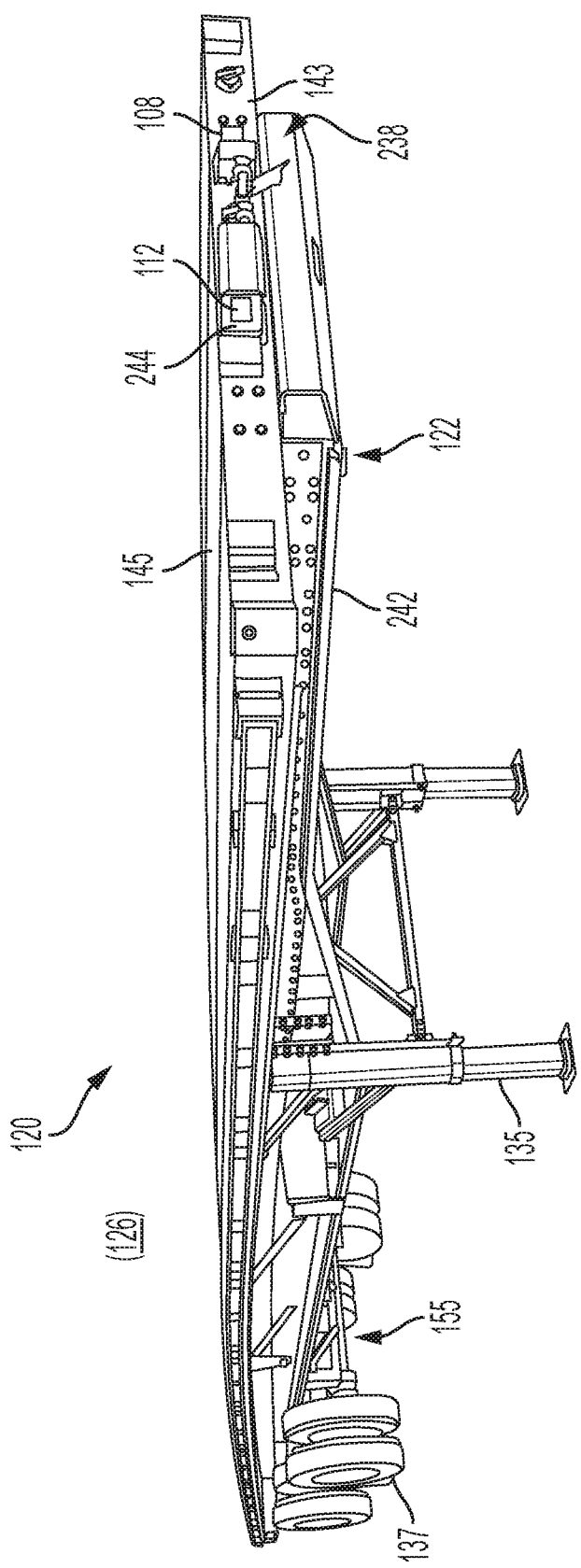
FIG. 9 is a perspective view of a semi-trailer having a camera system in accordance with an embodiment of the present invention.
Figure 10:
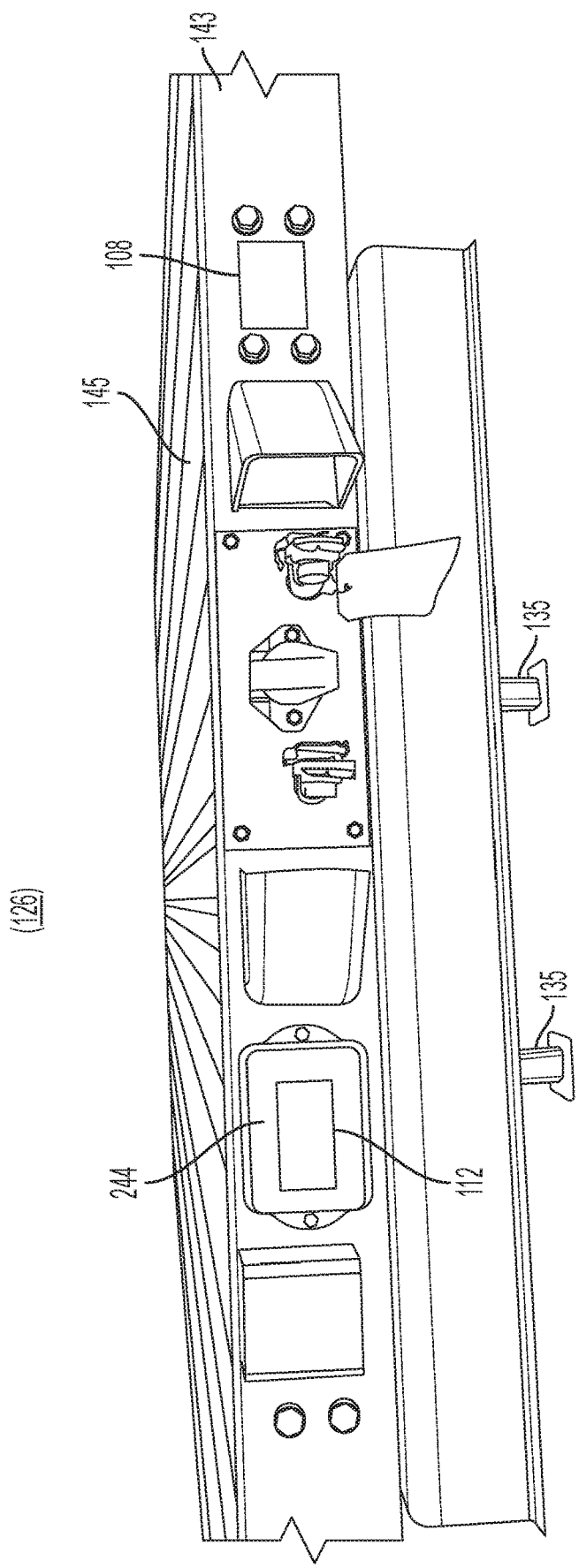
FIG. 10 is a partial front view of the semi-trailer as in FIG. 9.

Referring to FIGS. 1 and 5-8, cargo area 126 may be defined between opposing side walls 125 (one of which is shown in FIG. 1), front wall 128 extending between a front top rail 141 and a front bottom rail 143, a cargo deck comprised of flooring 145 extending between opposing bottom rails 127 (one of which is shown in FIGS. 1, 5, and 8) at the bottom ends of respective side walls 125, a roof and ceiling 147 extending between opposing side top rails 129 (one of which is shown in FIGS. 1, 5, and 8) at the top ends of respective side walls 125, and one or more rear doors 149 enclosing an opening defined by a rear frame 131 extending about the trailer's rear end 133 and attached to top and bottom rails 127 and 129. It should also be understood that frame 122 may comprise I-beam cross members 151 extending laterally across the width of the trailer, and attached to and between bottom rails 127, that support flooring 145. In a sheet-and-post van-type semi-trailer example, bottom rails 127, top rails 129, vertical posts 153 extending between the top and bottom rails, rear frame 131, and front frame 139 (which may be considered to include front top rail 141 and front bottom rail 143) may also be considered part of frame 122, to which outer and inner sheet material is attached to form outer and inner wall and roof surfaces. Referring also to FIGS. 9 and 10 with regard to an example platform trailer 120, frame 122 may comprise a pair of longitudinal I-beams 242 (one of which is shown in FIG. 9) extending front-to-back underneath the deck 145 and cross members disposed between the longitudinal I-beams and the floor, and cargo area 126 may be considered the open area immediately above the cargo deck 145. In a container trailer, the frame may also comprise a pair of longitudinal I-beams and cross members, with the container supported by the I-beams to provide the trailer body and define an interior cargo area. Thus, in a container trailer, the cargo deck may be considered the container floor. Frame 122 may be supported by a pair of opposing retractable legs 135 or other support at the trailer's forward end and at the trailer's rear by a suspension 155 (sometimes referred to as a "bogie") that supports eight wheels 137 rotatably disposed on a pair (or more) of axles (with four wheels to each of the two axles) extending laterally across the trailer's width beneath the floor. Accordingly, the frame, front legs, suspension, and wheels may comprise a wheeled chassis that supports a cargo area, which may be defined by an enclosed body attached to the frame or may be defined by an open area above a platform trailer deck. Thus, it should be understood that while the van-type and platform trailers discussed herein are provided for purposes of example, other types of semi-trailers or other trailers may be used in the context of the present disclosure.

A camera system 100 affixed to trailer 120 may include at least one first camera 112 attached to at least one of the body (e.g. at front wall 128, at front top rail 141 of a van trailer or at the top of a front bulkhead (not shown) extending up from the front rail of a platform trailer) and the wheeled chassis (e.g. at front bottom rail 143 or other part of the frame, e.g. in a platform trailer) so that, when camera 112 is activated, a rear area of a tractor 130 (FIG. 2) to which the trailer is operatively coupled is within the camera's operational field of view, i.e. such that video and/or still images acquired by the camera include such rear area of the tractor. In the presently-described examples, a single first camera 112 is mounted to trailer front wall 128, but in other embodiments, multiple first cameras can be utilized. It should be understood that various types of cameras may be used as the cameras discussed herein and that any particular camera configuration discussed herein is presented by way of explanation and not limitation. For example, CCD-sensor-based or CMOS-sensor-based cameras, such as are used as "backup" cameras for vehicles, may be used as any of cameras 112 or 113 as discussed herein. In particular, commercially available backup cameras are small and are often packaged as sold in such a way to easily facilitate the camera's attachment to surfaces. A lip-mounted backup camera, for example, may have a housing having a mounting surface that is acutely angled with respect to a plane perpendicular to the camera lens' optical axis (or, the axis of the camera's field of view). More generally, bracketed backup cameras may have housings that connect to a surface via brackets that can be adjusted in position. In either instance, the camera, in this case camera 112, may attach via its housing or a bracket connected thereto to a lower-facing recessed surface of front top rail 141 (or, with reference to FIGS. 9 and 10, the front rail of a platform trailer) so that the camera's lens axis extends from the camera forwardly toward the tractor (directly or to some degree downward, in the case of a camera mounted on the top rail of a van trailer, or directly forward or to some degree upward, in the case of a camera mounted on the front rail of a platform trailer) and the camera's operational field of view encompasses the tractor's rearward area as discussed herein. The camera may communicate through a wired or wireless communication connection with the remainder of the telematics system, for example as discussed herein. As discussed herein, the camera may be configured to capture and output video data, but it should be understood that the camera may also, or instead, capture still image data. Example cameras that may be used as cameras 112 and/or 113 include Models BUCAM200J or BUCAM300AJ sold under the JENSEN brand by ASA Electronics, LLC of Elkhart, Indiana; Model 9002-7601 sold under the BRANDMOTION brand by Brandmotion, LLC of Southfield, Michigan; Model HCE-C1100 sold under the ALPINE brand by Alpine Electronics of America, Inc. of Torrance, California; Model CMOS-230 sold under the KENWOOD brand by JVCKenwood USA Corporation of Long Beach, California; Model ND-BC8 sold under the PIONEER brand by Pioneer Electronics (USA), Inc. of Torrance, California; and Model BC 30 sold under the GARMIN brand by Garmin International, Inc. of Olathe, Kansas. Also, for example, cellular, wireless digital cameras that may be used for cargo area cameras 113 further include model XT1120 cameras available from Xirgo Technologies, LLC of Camarillo, California and cameras sold under the CARGOVISION brand by Compology Inc. of San Francisco, California.

Camera system 100 may also include one or more second cameras 113 disposed within the trailer's interior so that the cameras' fields of view encompass all or part of cargo area 126. In the illustrated example, three second cameras 113 are utilized and may be attached to an inward surface of side top rail 129 at the convergence of one of the side walls 125 and the roof, at the trailer's interior, so that the cameras may acquire images that encompass all or substantially all of the cargo area. Cameras 113 may be the same type of camera as discussed above with regard to camera(s) 112 but may also be selected to have infrared capability, particularly if images are to be taken of the trailer interior when minimal visible light is available.

Referring additionally to FIG. 2, a tractor 130 of a semi-trailer truck may include a cab 132, supported by a chassis 135, and a fifth wheel 134 that is disposed on an upper surface of chassis 135 and that is configured to selectively engage kingpin 124 of a corresponding trailer 120, as should be understood in this art. In accordance with an embodiment, tractor 130 may include indicia 136 disposed on a rearward-facing surface of the tractor that is unique to that tractor among a predetermined group of other tractors with which the trailer may be used. For example, where the tractor and trailer are part of a fleet of tractors and trailers owned and operated by a common fleet operator, a given tractor's indicia 136 be unique to that tractor within the fleet operator's fleet of tractors, such that each indicia 136 on each tractor within the fleet or other predetermined group of tractors uniquely identifies that tractor among all the tractors within the predetermined group. As with the previously discussed trailer 120, indicia 136 may comprise a series of alphanumeric characters. In some embodiments, indicia 136 for each tractor within the predetermined group is not unique within the group and may in fact be the same for all tractors within the group, though unique with regard to tractors not within the group. Thus, for example, each tractor within a fleet may have the same set of alphanumeric characters, or one or more non-alphanumeric symbols, or a paint scheme as an indicia 136 that thereby distinguishes the tractors of that fleet from the tractors of all other fleets, such that an image captured by a camera 112 may identify whether or not the trailer to which the camera is mounted is coupled to a tractor of the correct fleet, even if the specific tractor is not distinguishable among the other tractors within that fleet.

Indicia 136 may be disposed at a predetermined position on the tractor such that, when the tractor and the trailer are operatively connected to each other via the trailer kingpin and the tractor fifth wheel, indicia 136 is within the field of view of camera 112 (FIG. 3) mounted at the front wall of trailer 120, as indicated at 100 in FIG. 1. In the example of FIGS. 1 and 2, camera 112/100 is mounted at the front wall of trailer 120 so that the camera's field of view encompasses the upper portion of the rear wall of cab 132, as shown in FIG. 2, when the trailer and tractor are operatively coupled to each other. A license plate 138, for example, may also comprise the indicia, for example depending on the position of camera(s) 112 of camera system 100 on the trailer such that the license plate is within the camera's field of view when trailer 120 is operatively coupled to tractor 130 via the trailer kingpin and the tractor fifth wheel. In other arrangements in which the camera's field of view includes indicia 136 in the upper back wall of tractor 130 as shown in FIG. 2, the license plate's alphanumeric characters may be replicated at that position. Moreover, it should be understood that various forms of indicia may be used to identify tractor 130 and that the specific examples provided herein do not limit the present disclosure. Still further, in certain embodiments, tractor 130 has no indicia 136. In such embodiments, for example, the camera is used to identify whether trailer 120 is or is not operatively connected to a tractor as described herein, whether or not the tractor has indicia within the camera's field of view.

Referring also to FIG. 3, camera system 100 (FIG. 1) is part of a telematics system 101 that may include a power source 102, a user input interface 108, a processor 106, a remote communications component 104, an alarm 114, a tractor event sensor 110, and other trailer sensors or data sources 115. Power source 102 may, for example, comprise a battery or battery pack but may, alternatively or in addition, comprise solar panels and/or other sources, such as grid power when and where available. In one or more embodiments, power source 102 may comprise a power connection to the power source provided with tractor 130 in combination with a battery located on trailer 120 such that, when the trailer's power connection to the tractor's power source is made, the tractor's power source provides power to the system as shown in FIG. 3 but, when the trailer's power connection to the tractor's power source is disconnected, the trailer battery provides power to the system. Power source 102 is electrically connected to the various components as indicated schematically at FIG. 3, though it should be understood that circuitry may be provided between the source and the components as needed to provide the appropriate power level to each given component, as should be understood in view of the present disclosure. For example, a pair of relay switch circuits 148 may be provided between power source 142 and cameras 112/113 and alarm 114, where processor 106 controls switches 148.

In one or more embodiments, other than a part of power source 102 and possibly the user interface, the entirety of the components of telematics system 101 are located and mounted upon the trailer, for example within an electronics housing 244 mounted to the front rail 143 as illustrated in the example of a platform trailer as in FIGS. 9 and 10. It should be understood, however, that tractor 130 may also include a telematics system and that telematics system 101 may be at least in part embodied by components of the tractor telematics system, such that telematics system 101 is operative when trailer 120 is operatively coupled to tractor 130.

Processor 106 may communicate with other components of telematics system 101, such as a processor 140 of input interface component 108, remote communications component processor 105, alarm 114, cameras 112/113, and switches 148, via an internal bus 150. As should be understood, bus 150 may be a communication system within the trailer composed of a hardware component to convey electrical signals among the system components and a software component that implements a communications protocol to govern the electrical signal conveyance over the hardware component. Thus, for example, the bus hardware may comprise a multiplexed wire bundle controlled by a common protocol. Examples of suitable bus arrangements include a controller area network, a local interconnect network, an automotive power-line communication multiplexed network, or other communications network conforming to a suitable standard or specification, e.g. as promulgated by ISO and/or IEEE. Data from bus 150 may be translated into an RS232 signal for conveyance to any of the processors described herein that are in communication with the bus by a commercially-available data translator, as should be understood. Moreover, the arrangement and operation of internal buses should be understood, and it should be understood that various bus configurations may be employed within the scope of the present disclosure.

Input interface component 108 may include a processor 140, memory 142, a display 144, and a keypad 146 and may be disposed on the corresponding trailer 120 in a location that is readily accessible by an operator of a tractor 130, e.g. a lower corner of trailer front wall 128, as illustrated in FIGS. 1 and 7. The communication between input interface component 108 and processor 106 by way of bus 150 and the input/output circuitry and modules of both devices allows processor 106 to be disposed remotely from input interface component 108. For example, input interface component 108 may be located on an outer surface of a trailer, whereas processor 106 may be located within an enclosed cargo area where it is protected from the elements. Processor 140 of input interface component 108 monitors and receives keystroke data from the interface's corresponding keypad 146, processes the input data corresponding to keystrokes from the keypad, and transmits the corresponding data to the processor 106, thereby allowing an operator of a tractor unit to communicate with a remote dispatcher.

It should also be understood that while FIG. 3 illustrates wired communications among the components of telematics system 101, such communications may also include one or more instances of wireless communications. Thus, for example, cameras 112 and/or 113 may communicate with bus 150 through a wired connection but may also each include a wireless transmitter/receiver that may communicate with a wireless transmitter/receiver in communication with bus 150 so that the communications discussed herein may be effected through wireless transmissions between the camera transmitters/receivers, on the one hand, and the system transmitter/receiver, on the other hand. Thus, it should be understood that the direct line connections shown in FIG. 3 between bus 150 and cameras 112/113 may encompass such wireless communications and the transmitter/receiver hardware to effect them. Similarly, other components of telematics system 101, for example communications component 104, input interface component 108, event sensor 110, and/or alarm 114, may communicate with processor 106, with or without a bus 150, via wireless communications, for example where such components include wireless transmitters/receivers and the telematics system includes one or more wireless transmitters/receivers in communication with processor 106. Thus, as with the cameras, it should be understood that the direct line connections shown in FIG. 3 between bus 150 and one or more of the operative components that communicate with processor 106 may represent wireless as well as wired connections. As should be understood in view of the present disclosure, such wireless communications may be effected using communications equipment that operate under the Bluetooth or other short range standard.

The telematics system may be used to facilitate communications with and the acquisition of data from various sensors and other data sources mounted at various locations about the trailer, as well as components of the telematics system needed for the system to function. Thus, for example, processor 106 additionally communicates via bus 150 with memory 158, remote communications component processor 105, alarm 114, cameras 112/113, event sensor 110, relay switches 148, and trailer sensors or other data sources 115, and through a direct connection to memory 160. Processor 105 controls the operation of remote communications component 104, which in turn may comprise a receiver and transmitter (including one or more antennas) 152, a global positioning system (GPS) navigation unit 154, and memory 156, and related circuitry (e.g., one or more local oscillators) in support of these components, as will be understood in view of the present disclosure. As should be understood, receiver and transmitter 152 may comprise a cellular chipset and wireless modem in communication with processor 105. Processor 105 may also control the operation of transmitter/receiver 152 to receive signals from and transmit signals through the one or more antennas in communication with a wireless network 162. Upon receipt of information from signals received from the wireless network, processor 105 transmits such information in signals to processor 106 via bus 150. Upon receipt of a transmission instruction from processor 106 via the bus, processor 105 may drive transmitter 152 to transmit a signal, via the one or more antennas, carrying information provided by processor 106 with the instruction, over the wireless network. Integrally with such operations, processor 105 may utilize memory 156 for data storage and as a source for computer program instructions upon which the processor operates. As should be understood, processor 106 may operate similarly with regard to memory 160.

The cellular chipset may comprise or be a part of a cellular telephone, e.g. an analog or digital phone. The telephone circuitry may have the capability of switching frequency and may be capable of switching between analog (e.g. AMPS—advanced mobile phone service) and digital (e.g. TDMA—time division multiple access, CDMA—code division multiple access, or GSM—global system for mobile telecommunications) standards.

Wireless network 162 may be a computerized system that effects wireless data connections between network nodes. Network 162 may comprise a cellular network comprising cell towers, base stations, and mobile switching centers. The construction and operation of cellular communications networks, and other wireless communications networks, should be understood in this art.

GPS navigation unit 154 may be in communication with a GPS satellite constellation to receive GPS location signals broadcast therefrom and to acquire from the broadcast signals coordinates (e.g. global latitude and longitude) that identify the position of GPS navigation unit 154 and, as the navigation unit is mounted to the trailer, trailer 120. As should be understood, the GPS satellites within the constellation each includes an accurate time clock, such that the satellites transmit their location signals at predetermined instants. Navigation unit 154, which may include a satellite receiver, may be programmed to determine its latitude and longitude in response to differences in reception time of signals received from multiple (e.g. at least three) GPS satellites within the constellation. The navigation unit may have map data, e.g. stored in memory 156, defined in terms of global longitude and latitude and including at least an area local to the position of the semi-trailer truck. Upon deriving the unit's latitude and longitude coordinates, the navigation unit processor may retrieve a portion of the map data including and proximate the derived longitude and latitude and modify the map data to insert an indicator identifying the navigation unit's/trailer's position in the map. Navigation unit 154 may provide the latitude and longitude coordinate data, the modified map data, and a time stamp, to communication unit processor 105 which, in turn, may transmit that information to processor 106 via bus 150. Processor 106 may, in turn, transmit the information back to processor 105 for transmission to a fleet operator 164 via receiver and transmitter 152 and wireless network 162. Alternatively, upon receipt of a status request signal from remote fleet operator 164 via receiver and transmitter 152 over wireless network 162, processor 106 may transmit an instruction to communication unit processor 105, instructing processor unit 105 to acquire GPS location and time data, as described above, and to transmit that data (which may include a modified map as described above) to the fleet operator via receiver and transmitter 152 and wireless network 162.

Sensor system 110 may comprise, for example, one or more capacitor sensors or Hall effect sensors mounted on trailer 120 at or otherwise proximate kingpin 124 and configured so that the signal output from each of the one or more sensors changes state in response to the kingpin's operative disposition within fifth wheel 134 of tractor 130. That is, in such embodiments, the one or more sensors, and in particular its/their output signal(s), may exist in a first state when kingpin 124 is not operatively engaged within fifth wheel 134 to thereby operatively couple the trailer to the tractor and in a second, different, state when kingpin 124 is operatively engaged within the fifth wheel to couple of the trailer to the tractor. Sensor system 110 may also include a controller and associated memory that receives the output signal(s) from the one or more proximity sensors and determines the state of the output signal. Via bus 150, processor 106 may query the controller of sensor system 110 for sensor output signal state and receive a signal transmitted from the sensor system controller indicating the state of the sensor output signal in response to the query.

It will be understood from the present disclosure that the functions ascribed to processor 106, processor 105, processor 140, and the sensor system controller, as well as any remote computing devices (e.g. processor 168) communicating with processor 106 via communications system 104, may be embodied by respective computer-executable program instructions of respective computer programs that are embodied on computer-readable media (e.g. memory 142, 156, 160, and 170 operatively associated with respective processors 140, 105, 106, and 168) and that execute on one or more processors (e.g. processors 105, 106, 140 or the sensor system controller) such as microprocessors or programmable logic controllers (PLCs) that execute the program instructions to perform the functions as described herein. Each processor (e.g. 104, 105, and 140) that controls the operation of one or more other devices may be considered, collectively or individually, to be a computer, while other processors (e.g. the sensor system controller) control the collection and communication of data and may be considered components of a computer. Each such computer or component may include and/or be operatively associated with one or more tangible non-transitory computer-readable storage media for storing one or more computer-executable instructions or software for implementing exemplary embodiments. For example, memory included in association with such a computer may store computer-executable instructions or software, for example instructions for implementing and processing every module of a programming environment. The memory may include a computer system memory or random access memory (RAM), such as dynamic RAM (DRAM), static RAM (SRAM), extended data out RAM (EDO RAM), EEPROM, CD-ROM, DVD or other types of optical storage medium or magnetic storage device or removable non-volatile storage device, etc., or a combination thereof. As indicated below, the dispatcher processor at the fleet operator may also be a computer or a part thereof.

Generally, program modules of the computer programs reflected by the present disclosure may include routines, programs, components, data structures, etc., that perform particular tasks and/or implement particular abstract data types. Moreover, those skilled in the art will appreciate that the systems/methods described herein may be practiced with various processor configurations, including programmable logic controllers, simple logic circuits, single-processor or multi-core processor systems, as well as personal computers, hand-held computing devices, microprocessor-based or programmable consumer or industrial electronics, and the like. Aspects of these functions may also be practiced in distributed computing environments, for example in so-called "smart" arrangements and systems, where tasks are performed by remote processing devices that are linked through a local communications network (e.g. local to the trailer) to the components otherwise illustrated in the Figures. In a distributed computing environment, programming modules may be located in both local and remote memory storage devices. Thus, the control system may comprise a computing device that communicates with the system components described herein via hard wire or wireless local or remote networks. A processor that could effect the functions described herein could include a processing unit and system memory, where system bus 150 couples the system memory to the processing unit. The processing unit can be any of various available programmable devices, including microprocessors, and it is to be appreciated that dual microprocessors, multi-core and other multi-processor architectures can be employed as the processing unit.

Software applications may act as an intermediary between users and/or other computers and the basic computer resources of the electronic control system, as described, in suitable operating environments. Such software applications include one or both of system and application software. System software can include an operating system that acts to control and allocate resources of the control system. Application software takes advantage of the management of resources by system software through the program modules and data stored on system memory. The control system may also, but does not necessarily, include one or more interface components that are communicatively coupled through the bus and facilitate an operator's interaction with the control system. By way of example, the interface component can be a port (e.g., serial, parallel, PCMCIA, USC, or FireWire) or an interface card, or the like. The interface component can receive input and provide output (wired or wirelessly). For instance, input can be received from devices including but not limited to a pointing device such as a mouse, track ball, stylus, touch pad, key pad, touch screen display, keyboard, microphone, joy stick, gamepad, satellite dish, scanner, camera, electromechanical switches and/or variable resistors or other adjustable components, or other components. Output can also be supplied by the control system to output devices via the interface component. Output devices can include displays (for example cathode ray tubes, liquid crystal display, light emitting diodes, or plasma) whether touch screen or otherwise, speakers, printers, and other components. In particular, by such means, the control system receives inputs from, and directs outputs to, the various components with which the control system communicates, as described herein.

As previously noted, the sensor array of camera system 100 may include a forward-facing camera 112 on front wall 128 of trailer 120. In certain embodiments, forward camera 112 may be positioned on the front wall so that the camera's field of view encompasses tractor 130, and in particular a portion of the rear of tractor 130 that may include indicia that uniquely identifies tractor 130 among a predetermined group of tractors, e.g. a fleet of commonly owned and/or operated tractors or that commonly identifies tractor 130 as being a part of a predetermined group of tractors even if the indicia does not distinguish among the tractors in the group. As described below, processor 106 may, in one or more example embodiments, acquire an image of the tractor 130 rear from forward camera 112 (via video data or still image data) in response to a signal from the one or more sensors 110 indicating that trailer 130 has changed state from being decoupled from tractor 130 to being operatively coupled to tractor 130 or in response to a signal from processor 105 conveying an instruction from a remote entity, e.g. a fleet operator, to actuate forward camera 112 to acquire such image data. Similarly, processor 106 may acquire an image (e.g. video data or still image data) of cargo area from cargo area cameras 113 in response to a signal from the one or more sensors 110 indicating that trailer 130 has changed state from being decoupled from tractor 130 to being operatively coupled to tractor 130 or in response to a signal from processor 105 conveying an instruction from the remote entity, e.g. a fleet operator, to actuate cargo cameras 113 to acquire such images. Each of cameras 112 and 113 may be a digital camera capable of capturing still images and/or video images at all levels of ambient light. Infrared or infrared-capable cameras may also be used, particularly for cargo area cameras 113. Camera 112 and/or cameras 113 may be capable of capturing video clips of a pre-selected duration when desired. In certain embodiments, camera system 100 may include one or more infrared cameras for capturing still images and/or video clips where the use of white light, i.e., a flash, is not desired due to possible adverse effects on the vision of the tractor operator.

System 101 may also include an alarm 114. Alarm 114 may comprise circuitry that alternately drives a blinking green light emitting diode (LED) or other light (G) and a blinking red LED or other light (R), depending on the state of a signal provided from processor 106 to alarm circuitry 114 over bus 150. Processor 106 may, in turn, provide the control signal to alarm circuitry 114 in response to an instruction signal from remote fleet operator 164 received by communications component processor 105 via receiver and transmitter 152 over wireless network 162. Thus, dispatcher 164, having viewed the camera image provided by processor 106 and acquired by camera 112, may determine whether or not trailer 120 is operatively coupled to the correct tractor 130. If the trailer is coupled to the correct tractor, a dispatcher at fleet operator 164 controls a computer system at the fleet operator's remote facility to transmit an instruction signal over network 162 to telematics system 101 that causes processor 106 to drive alarm circuitry 114 to actuate green light G. If the tractor is not coupled to the correct trailer, the fleet operator causes its computer system to transmit a different signal to system 101 that causes processor 106 to drive alarm circuitry 114 to actuate red light R. Alarm 114 may also include an audible component in the form of an annunciator (not shown).

Fleet operator 164 is remote from telematics system 101 but communicates with system 101 over wireless network 162 via a receiver and transmitter 166. Fleet operator 164 may operate one or more computer systems, each comprising a processor 168, memory 170, a display 172, and a keypad 174. As described below, fleet operator 164 may provide instructions to system 101 to acquire images from cameras 112 and 113 and may receive resulting camera images from system 101 in response to such instructions.

Accordingly, as discussed herein, information may be exchanged between fleet operator 164 and telematics system 101. The telematics system, including its computerized operations and database system, may be remote from the fleet operator, including from a dispatcher thereof. "Remote" does not necessarily refer to the physical relationships between the telematics system and the fleet operator's computer systems, but instead may indicate that neither computer system controls the operations or data of the other. Thus, the fleet operator may be remote from the telematics system, and vice versa, not necessarily indicating spatial separation (although the trailer telematics system may often, if not always, be spatially separated from the fleet operator system), but instead indicating that one computer system does not have control over the other computer system, including its data.

OPERATION

Upon locating a trailer 120 based on identification indicia 121 provided by a remote dispatcher, a semi-truck operator may begin to back tractor 130 toward the front end of trailer 120 in an attempt to engage kingpin 124 with fifth wheel 134. As the tractor's fifth wheel 134 engages the kingpin 124 of trailer 120, event sensor 110 may detect the coupling, causing the sensor's output signal to change state, which is detectable by processor 106. In turn, processor 106 may send an activation signal to camera 112, thereby causing camera 112 to capture an image of the now-coupled tractor. Processor 106 may instruct camera 112 to transmit the camera image, at which point camera 112 may transmit the acquired camera image either to processor 106 or communication processor 105, via bus 150. If processor 106 receives the camera image data, stored in memory 160, processor 106 may forward, via bus 150, the image data to communication processor 105, which may store the image data in memory 156. Processor 106 may also instruct processor 105 to acquire GPS coordinates. Processor 105 may responsively actuate GPS navigation unit 154, which may acquire GPS coordinates for the trailer, and optionally associate those coordinates with an identifier in map data, and store the GPS/map data at 156 in association with the camera image data. Processor 105 may then actuate receiver and transmitter 152 to transmit the camera image data and associated GPS data to fleet operator 164 via network 162. Receiver and Transmitter 166 may receive the camera and GPS data from network 162 and forward the received data to processor 168 of fleet operator 164.

Alternatively, a dispatcher at fleet operator 164 may wish to determine whether trailer 120 is coupled to the correct tractor 130 or, e.g., simply whether trailer 120 is coupled to a tractor 130 that is part of the fleet operated by fleet operator 164. This may occur, e.g., because the semi-truck operator, who has now coupled the operator's tractor to a trailer, has contacted the dispatcher by telephone, SMS text, email, or through entry of a message through keypad 146 (under control of processors 140 and 106, which control transmission of the message via transmitter 152, network 162, and receiver 166 to processor 168, which may drive display 172 to display the message to the dispatcher), notifying the dispatcher that the operator has coupled the tractor to the trailer and is ready for operation. The dispatcher knows the identity of the operator's tractor, and thereby knows the indicia 136 associated with that tractor due to records kept at the fleet operator, and knows the identity of the trailer that the dispatcher has assigned to the semi-truck operator to operate with that tractor. The communications system at fleet operator 164 may be configured to selectively communicate with the telematics system in each of the trailers 130 in the fleet operator's fleet. Thus, the dispatcher, through keyboard 174, may instruct fleet operator processor 168 to send an instruction, via receiver and transmitter 166, network 162, receiver and transmitter 152, communications processor 105, and bus 150, to the processor 106 of the predetermined trailer 120 that the fleet operator has assigned to the querying semi-truck operator and the operator's tractor to acquire image data from trailer front camera 112. In response, processor 105 may instruct camera 112 to acquire an image, and processor 105 then coordinate the transmission of the image data, with associated GPS data, to fleet operator processor 168, as discussed above.

In either circumstance, upon receiving the camera image data, fleet operator system processor 168 may drive display 172 to display the received image data (i.e. the image acquired by camera 112). The dispatcher at fleet operator 164 may view the displayed image and identify tractor 130 in the received image by way of indicia 136, e.g. license plate 138 or other alphanumeric indicia, or the tractor's paint scheme. For example, where the dispatcher knows that the specific trailer 120 should be coupled to a particular tractor 130, and knows the indicia 136 associated with that tractor, the dispatcher may view the image data at display 172 to confirm, by comparing the indicia 136 that appears in the image with the dispatcher's predetermined knowledge (e.g. as derived from a database that associates tractors with indicia) of the expected indicia, whether the trailer is indeed coupled to the correct, expected tractor. If trailer 120 is coupled to the correct tractor, the dispatcher may control processor 168 via keyboard 174 to send a confirmation signal to processor 106 by way of receiver and transmitter 166, network 162, receiver and transmitter 152, processor 105 of communication component 104, and bus 150. Processor 106 next sends a confirmation signal to alarm 114 which responsively activates the green light (G). As alarm 114 may be disposed at the trailer's exterior, with input interface 108, this notifies the semi-truck operator that the operator has coupled the operator's tractor to the correct trailer, thereby indicating operations should continue.

Having confirmed that the semi-truck operator has coupled the correct trailer to the correct tractor, the dispatcher may wish to view the trailer's cargo area contents. To do this, the fleet dispatcher may utilize keyboard 174 to cause fleet operator processor 168 to send an instruction signal to the trailer's processor 106 via receiver and transmitter 166, network 162, receiver and transceiver 152, communication component processor 105, and bus 150. In response, processor 106 actuates the power switch 148 to cameras 112 and 113 and sends an instruction signal to cameras 113 to cause those interior cameras to acquire respective images of the cargo area. Processor 106 instructs cameras 113 to upload the acquired image data (e.g. either to processor 106, which forwards the data to processor 105, or directly to processor 105). Processor 105 acquires GPS coordinates as discussed above, and optionally applies an indicia to map data that encompasses the acquired coordinates, and forwards the camera 113 image data, along with its associated GPS location data, to the fleet operator processor via receiver and transmitter 152, network 162, and receiver and transmitter 166. Dispatcher may then view the acquired cargo area images on display 172.

In the instance where the operator of tractor 130 has selected the incorrect trailer 120 as the assigned trailer, and thereby coupled tractor to the wrong trailer, the acquired image data at display 172 will not include the expected indicia 136. This may notify the dispatcher of the error. If, upon further communication with the semi-truck operator (or through receipt of a message from the tractor operator via input interface component 108 as discussed above), the dispatcher identifies the trailer that is (incorrectly) coupled to the tractor, the dispatcher may actuate keyboard 170 to send a signal to processor 106 of that tractor, indicating the error. Upon receipt, processor 106 of the (incorrect) trailer sends a signal to its alarm 114 that activates the red light (R). As noted, alarm 114 may also include an annunciator which would provide an audible signal to the operator that trailer 120 is not the trailer assigned to the operator's tractor. Input interface component 108 may allow the operator of tractor unit 130 to communicate with the remote dispatcher by way of the keypad and display, thereby rectifying the mis-identification of trailer 120 and directing the operator to the correct trailer.

Figure 4:
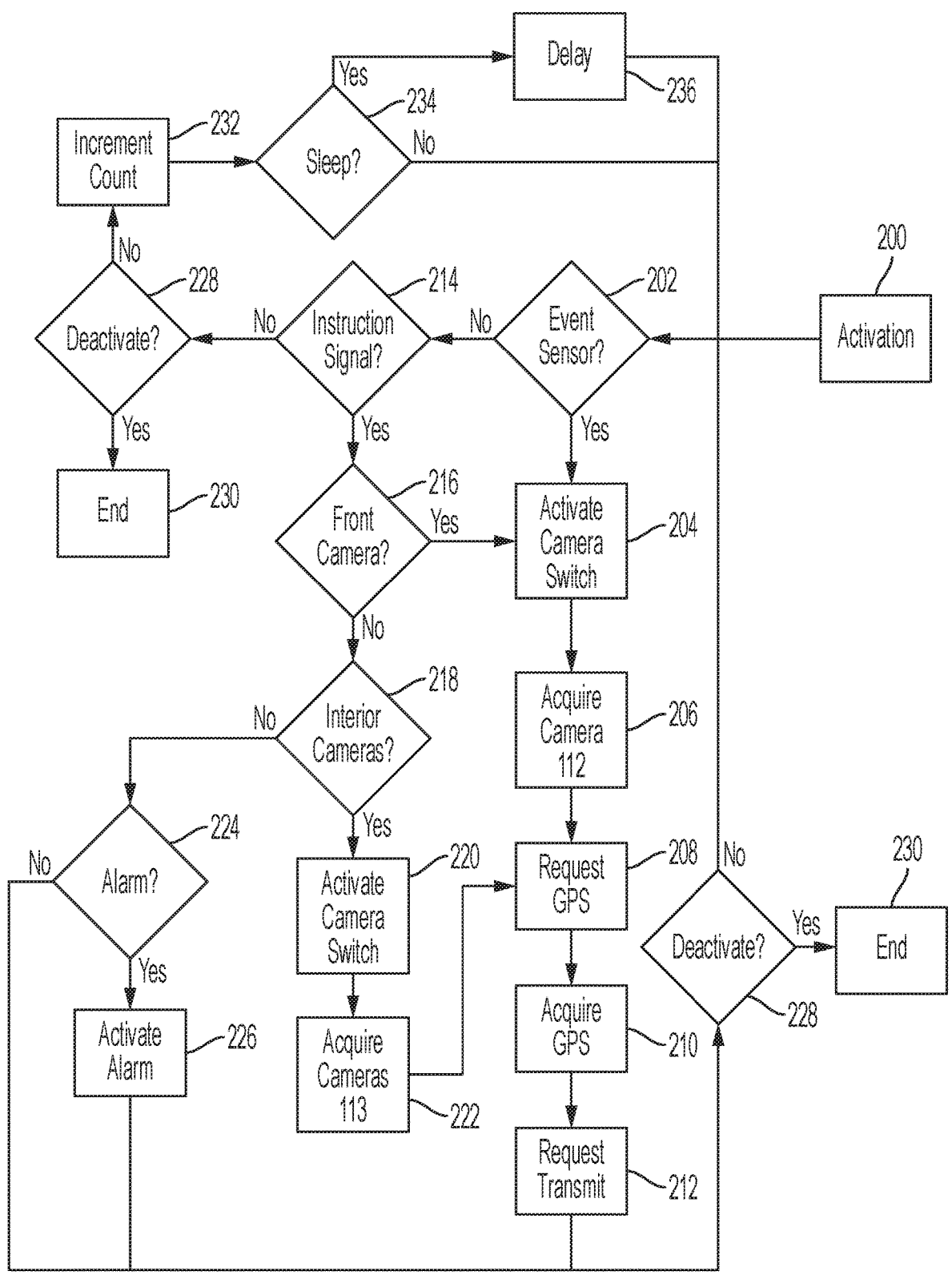
FIG. 4 is a flow chart of a method of use of the camera system as in FIG. 3.

FIG. 4 illustrates a possible flow sequence for the operation of processor 106 which, as described above, can be embodied by computer instructions of a computer program stored at 160. At 200, the semi-truck operator, via user interface component 108 and its keypad or touchscreen 144, may enter a command to actuate the telematics system. This causes processor 140, which processor 106 intermittently queries, to send a signal to processor 106 that the telematics system should be active, thereby causing processor 106 to intermittently monitor the possible system inputs that could cause the processor to acquire a camera image. Accordingly, at 202, processor 106 queries event sensor 110 via bus 150 to determine whether the event sensor's output signal has changed state, indicating the trailer's coupling to a tractor. If the event sensor output has changed state at 202, processor 106 may send a signal to actuate the alarm and camera power switches 148, at 204, and send a control signal to trailer front camera 112 to acquire an image, at 204. At 206, camera 112 may acquire an image (video or still) and forward the image data to processor 105 via bus 150. At 208, processor 106 may send a request to processor 105 to actuate GPS navigation unit 154 to acquire the trailer's GPS location coordinates, which the navigation unit acquires at 210. At 212, processor 106 instructs processor 105 to transmit the acquired image data (and GPS data) to processor 168 of fleet operator system 164 via receiver and transmitter 152, network 162, and receiver and transmitter 166.

If the event sensor does not have a state change at 202, processor 106 may query communication processor 105 at 214, to determine whether any instructions from the fleet operator system have been received by telematics system 101. If, at 214, an instruction signal has been received, processor 105 may transmit that signal via bus 150 to processor 106, which may determine at 216 whether the instructions signal is a request to capture image data from trailer forward camera 212. If the signal is such a request, processor 106 may activate the camera power switches at 204, and steps 206 through 212 execute as set forth above.

If, at 216, the received signal is not a request to acquire a front image, the processor may check at 218 whether the received signal is a request to acquire cargo space images from cargo area cameras 213. If so, processor 106 may activate the camera and alarm power switches 148 at 220 and send an instruction signal at 222 to cameras 113 to acquire the images (video or still) and upload the images to communication processor 105 via bus 150. Processor 106 may also request at 208 that processor 105 acquire the trailer's GPS coordinates by GPS navigation unit 154, which processor 105 does at 210. Processor 106 may then instruct communication processor 105 at 212 to transmit the cargo area images (and GPS data) to fleet operator processor 168 via receiver and transmitter 152, network 162 and receiver and transmitter 166.

If the signal is not an instruction at 218 to acquire cargo area images from cameras 213, processor 106 may determine at 224 whether the instruction is to actuate alarm 114. If so, the processor may drive alarm 114 to actuate the red or green light, at 226.

Once processor 106 requests transmission of data at 212 or actuates alarm 114 at 226, or if the received instruction signal is not an alarm instruction at 224 or is not an instruction signal at 214, the processor may determine at 228 whether an instruction has been received to disable operation. If so, the processor exits the monitoring routine, at 230. If not, the processor returns to step 202. If the processor reaches step 228 from step 214, and if the result of step 228 is that there is no instruction to deactivate, processor 106 may increment a sleep timer count at 232 and check at 234 whether the timer has timed out. If not, the processor returns to step 202, as set forth above. If so, the processor may execute a sleep mode at 236, at which the processor discontinues the provision of power to the cameras and, optionally, other components for some predetermined period of time before again checking for receipt of instructions at 202.

While one or more preferred embodiments of the invention are described above, it should be appreciated by those skilled in the art that various modifications and variations can be made in the present invention without departing from the scope and spirit thereof. Accordingly, it should be understood that the elements of one embodiment may be combined with another embodiment to create a still further embodiment. It is intended that the present invention cover such modifications and variations as come within the scope and spirit of the present disclosure, the appended claims, and their equivalents.

What is claimed:

1. A method of confirming coupling of a tractor of a semi-trailer truck to a trailer, comprising the steps of:
   providing a plurality of tractors, each tractor having an indicia that is different from the indicia of each other tractor in the plurality of tractors;
   providing a trailer having
      a wheeled chassis having at least two wheeled axles at a rearward end of the wheeled chassis, retractable legs, and a kingpin at a forward end of the wheeled chassis, and
      a body comprising a cargo deck supported by the wheeled chassis;
   providing a camera having a field of view and being mounted to at least one of the wheeled chassis and the body so that, when a tractor of the plurality of tractors is operatively coupled to the forward end of the wheeled chassis, the field of view of the camera includes the indicia of the tractor of the plurality of tractors;
   detecting that the wheeled chassis is operatively coupled to a tractor;
   in response to detection, at the detecting step, that the wheeled chassis is operatively coupled to a tractor, acquiring an image from the camera;
   transmitting the image acquired at the acquiring step to a remote computer system;
   receiving a response signal from the remote computer system in response to transmitting the image acquired at the acquiring step;
   in response to receipt of a said response signal that corresponds to coupling of the wheeled chassis to a correct tractor of the plurality of tractors, actuating a confirmation signal.

2. The method as in claim 1, wherein, at the step of providing a trailer, the wheeled chassis and the body comprise a van trailer.

3. The method as in claim 1, wherein, at the step of providing a trailer, the wheeled chassis and the body comprise a platform trailer.

4. The method as in claim 1, wherein the step of providing a trailer comprises providing
   a computer-readable medium containing program instructions, a processor at the trailer in operable communication with the computer-readable medium and including hardware-based logic or software-based logic to execute the program instructions, a wireless receiver at the trailer in operative communication with the processor, and a wireless transmitter at the trailer in operative communication with the processor, wherein the processor is configured by the program instructions to receive an instruction from the remote computer system through the wireless receiver and, in response to the received instruction, to control operation of the camera to acquire an image from the field of view and transmit data corresponding to the acquired image to the remote computer system through the wireless transmitter.

5. The method as in claim 4, wherein, at the step of providing a trailer, the body comprises a front wall at the forward end of the wheeled chassis, a pair of opposing side walls extending between the front wall and the rearward end of the wheeled chassis, a roof extending between the opposing side walls and between the front wall and the rearward end of the wheeled chassis, and a door disposed at an opening at the rearward end of the wheeled chassis bounded by the roof, the cargo deck, and the opposing side walls, wherein the cargo deck, the opposing side walls, the front wall, and the roof define a cargo area.

6. The method as in claim 5, wherein the step of providing a trailer comprises providing a second camera mounted to the body so that a field of view of the second camera includes at least part of the cargo area.

7. The method as in claim 6, wherein, at the step of providing a trailer, the processor is configured by the program instructions to receive a second instruction from the remote computer system through the wireless receiver and, in response to the received second instruction, to control operation of the second camera to acquire an image from the field of view of the second camera and transmit data corresponding to the acquired image from the field of view of the second camera to the remote computer system through the wireless transmitter.

8. The method as in claim 7, wherein the step of providing a trailer comprises providing a plurality of said second cameras.

9. The method as in claim 4, wherein the step of providing a trailer comprises providing a sensor disposed on the wheeled chassis and configured to change state of an output signal based upon proximity to the tractor to which the wheeled chassis is operatively coupled, wherein the processor is configured by the program instructions to receive the output signal and, in response to the received output signal, to control operation of the camera to acquire an image from the field of view and transmit data corresponding to the image acquired from the field of view to the remote computer system through the wireless transmitter.

10. The method as in claim 4, wherein, at the step of providing a trailer, the wireless transmitter is a cellular modem.

11. The method as in claim 1, wherein, at the step of providing a trailer, the body comprises at least one wall extending upward from the cargo deck.

12. The method as in claim 1, wherein, at the step of providing a plurality of tractors, the indicia is comprised of at least one alphanumeric character.

* * * * *